(12) United States Patent
Sadhu et al.

(10) Patent No.: US 7,174,348 B1
(45) Date of Patent: Feb. 6, 2007

(54) COMPUTER PROGRAM HAVING AN OBJECT MODULE AND A SOFTWARE DEVELOPMENT TOOL INTEGRATION MODULE WHICH AUTOMATICALLY INTERLINK ARTIFACTS GENERATED IN DIFFERENT PHASES OF A SOFTWARE PROJECT

(75) Inventors: Avinash Sadhu, Mission Viejo, CA (US); Paul Donald Koerber, Laguna Hills, CA (US)

(73) Assignee: Unisys Corporation, Blue Bell, PA (US)

( * ) Notice: Subject to any disclaimer, the term of this patent is extended or adjusted under 35 U.S.C. 154(b) by 710 days.

(21) Appl. No.: 10/306,602

(22) Filed: Nov. 26, 2002

(51) Int. Cl.
*G06F 17/00* (2006.01)
*G06F 7/00* (2006.01)
*G06F 9/44* (2006.01)

(52) U.S. Cl. .................. 707/104.1; 707/101; 707/102; 707/10; 717/101

(58) Field of Classification Search ............ 707/104.1, 707/102, 101; 709/205; 717/101
See application file for complete search history.

(56) References Cited

U.S. PATENT DOCUMENTS

| | | | |
|---|---|---|---|
| 5,557,515 A | 9/1996 | Abbruzzese et al. | |
| 5,768,506 A | 6/1998 | Randell | |
| 5,826,239 A | 10/1998 | Du et al. | |
| 5,867,824 A | 2/1999 | Saito et al. | |
| 6,006,215 A | 12/1999 | Retallick | |
| 6,032,124 A | 2/2000 | Saito et al. | |
| 6,088,679 A | 7/2000 | Barkley | |
| 6,157,934 A | 12/2000 | Khan et al. | |
| 6,256,773 B1 | 7/2001 | Bowman-Amuah | |
| 6,308,163 B1 | 10/2001 | Du et al. | |
| 6,311,191 B1 | 10/2001 | Retallick | |
| 6,332,155 B1 | 12/2001 | Notani | |
| 6,336,217 B1 | 1/2002 | D'Anjou et al. | |
| 6,338,074 B1 | 1/2002 | Poindexter et al. | |
| 6,356,880 B1 | 3/2002 | Goossens et al. | |
| 6,370,573 B1 | 4/2002 | Bowman-Amuah | |

(Continued)

OTHER PUBLICATIONS

Using Microsoft® Project 4 for Windows, Tim Pyron et al., 1954, Que® .*

*Primary Examiner*—John Cottingham
*Assistant Examiner*—Kuen S. Lu
(74) *Attorney, Agent, or Firm*—Charles J. Fassbender; Mark T. Starr; Phuong-Quan Hoang

(57) ABSTRACT

A computer-readable medium causes a computer to operate as a server for managing the development of software by a software development team. Stored on this computer-readable medium is a computer program which includes an object module and a software development tool integration module. The object module performs operations on a linked object structure which represents a software development project. The software development tool integration module has one interface which interacts with the object module and has another interface which interacts over a communication network with personal computer for the software development team. By this interaction, traceability links are created between an object, in the linked object structure, which represents a particular artifact that is generated by a member of the software development team, and various other objects which represent related items such as a tool that was used to create the artifact, a task that was performed to create the artifact, and a document that is related to the artifact.

11 Claims, 11 Drawing Sheets

U.S. PATENT DOCUMENTS

| | | |
|---|---|---|
| 6,381,640 B1 | 4/2002 | Beck et al. |
| 6,393,456 B1 | 5/2002 | Ambler et al. |
| 6,397,191 B1 | 5/2002 | Notani et al. |
| 6,424,979 B1 | 7/2002 | Livingston et al. |
| 6,430,538 B1 | 8/2002 | Bacon et al. |
| 6,434,658 B1 * | 8/2002 | Fukuzumi ................... 711/103 |
| 6,442,567 B1 | 8/2002 | Retallick et al. |
| 6,445,774 B1 | 9/2002 | Kidder et al. |
| 6,502,102 B1 * | 12/2002 | Haswell et al. ............. 707/102 |
| 6,633,878 B1 * | 10/2003 | Underwood ................. 707/100 |
| 6,701,345 B1 * | 3/2004 | Carley et al. ............... 709/205 |
| 6,701,514 B1 * | 3/2004 | Haswell et al. ............. 717/115 |

* cited by examiner

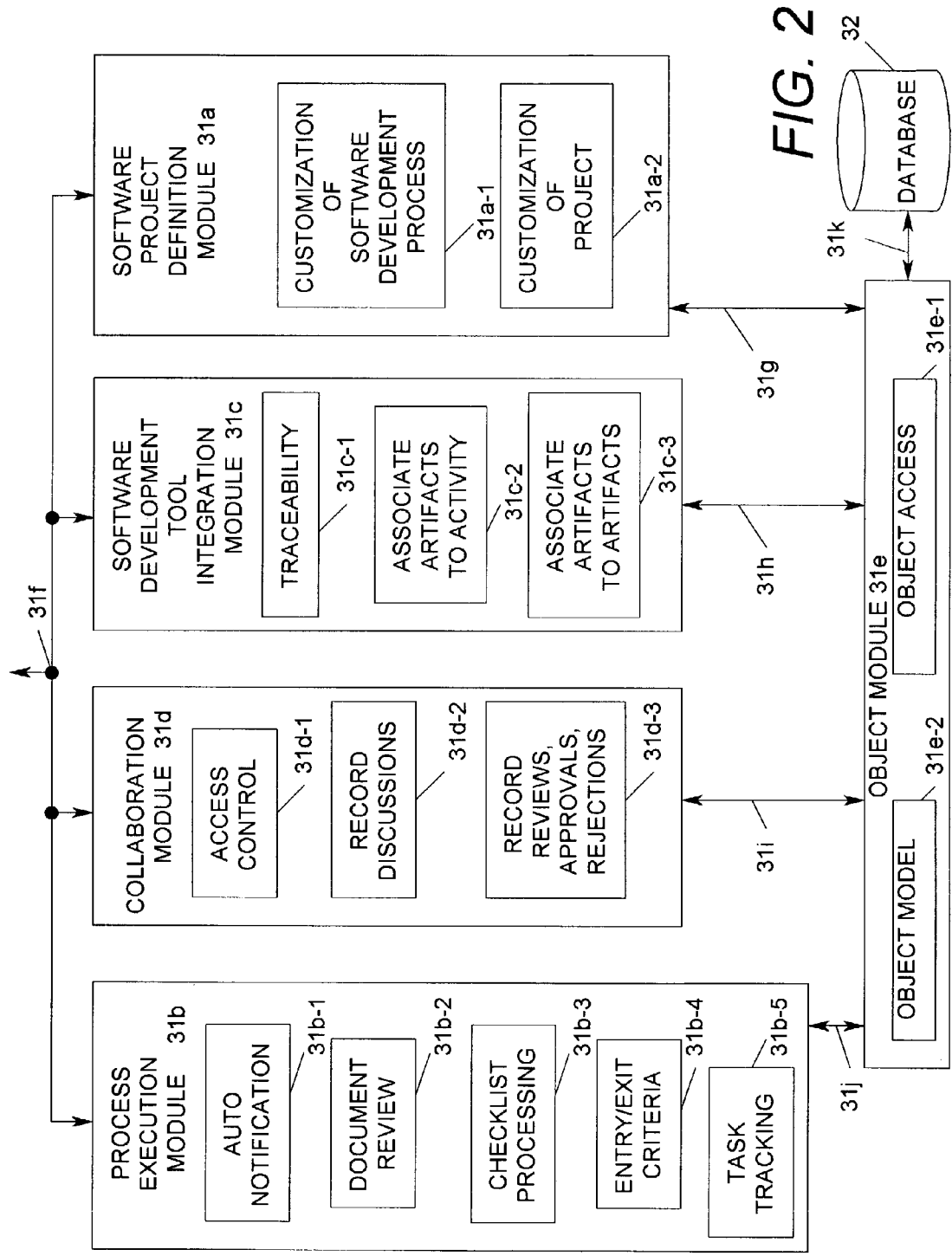

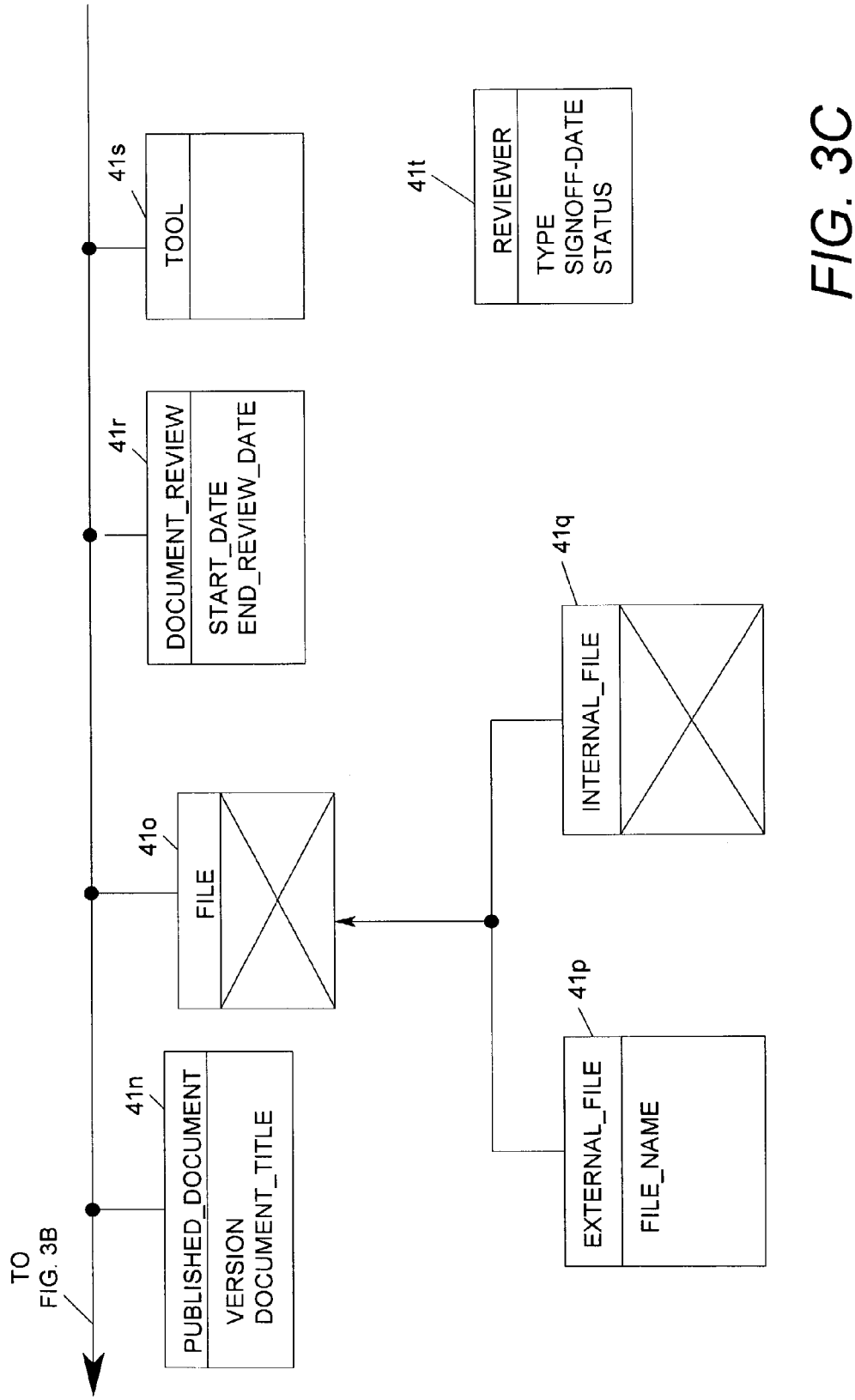

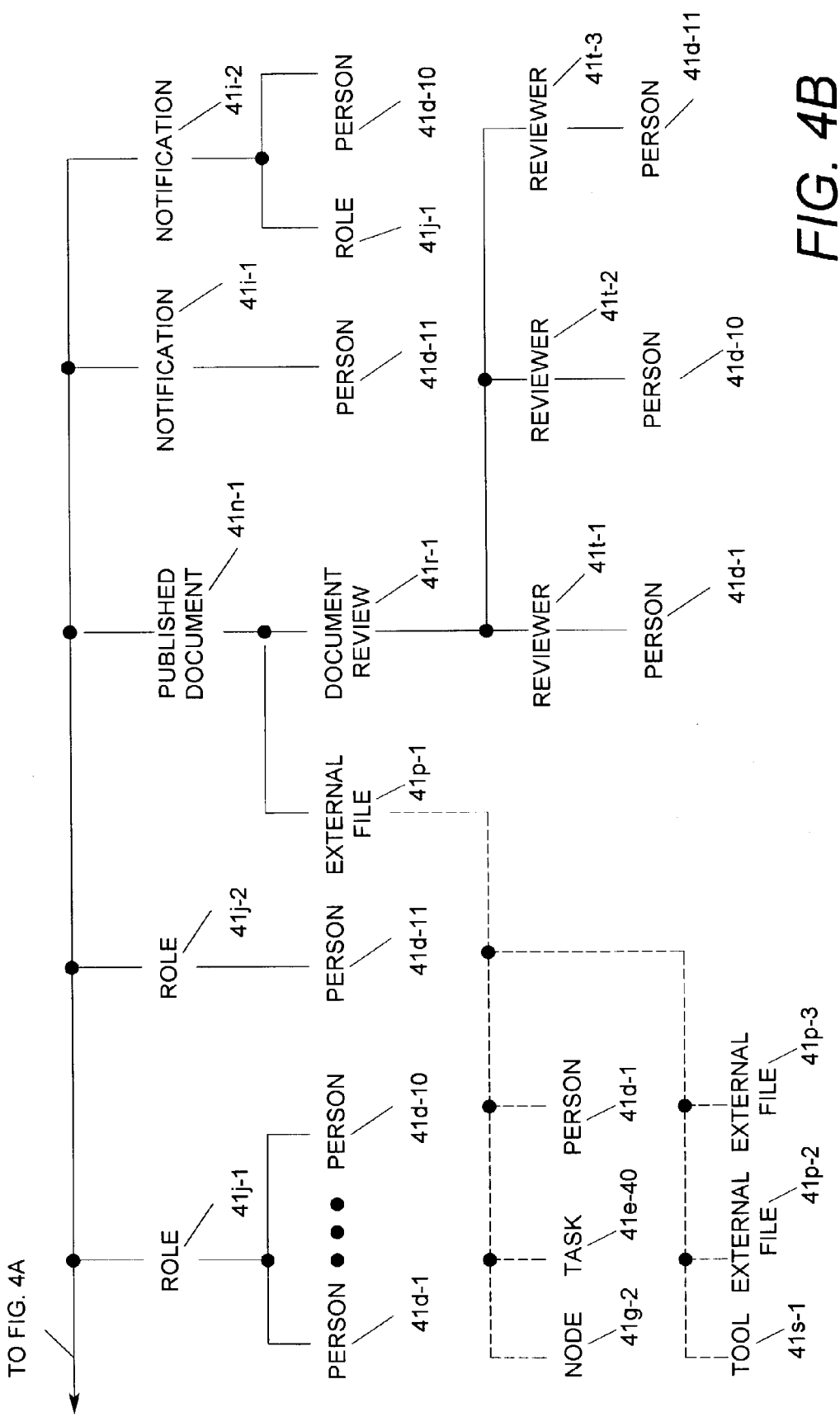

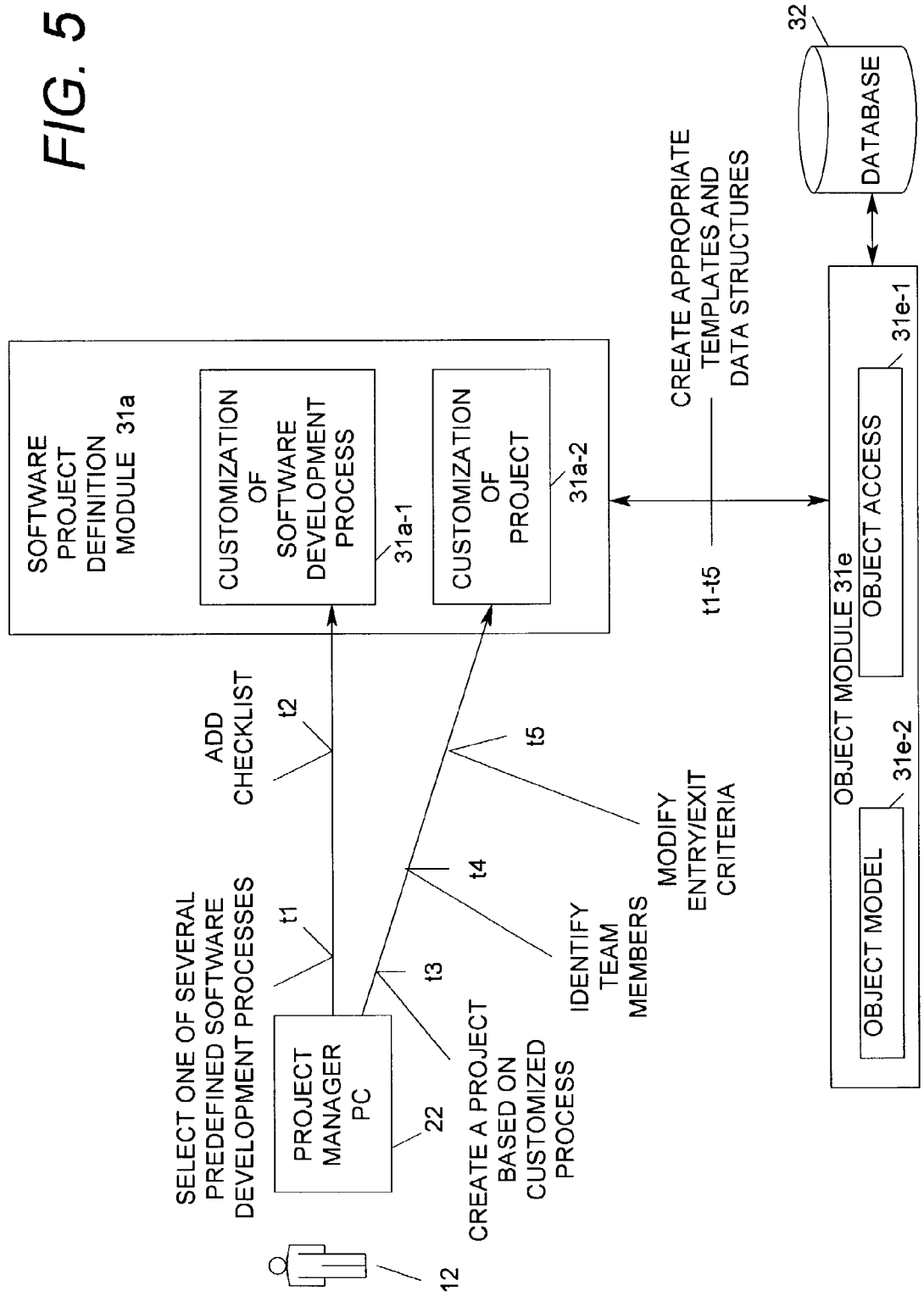

COMPUTER PROGRAM HAVING AN OBJECT MODULE AND A SOFTWARE DEVELOPMENT TOOL INTEGRATION MODULE WHICH AUTOMATICALLY INTERLINK ARTIFACTS GENERATED IN DIFFERENT PHASES OF A SOFTWARE PROJECT

RELATED CASES

The invention which is claimed herein is related to two other inventions that are entitled—a) "SERVER COMPUTER PROGRAM HAVING AN OBJECT MODULE AND A SOFTWARE PROJECT DEFINITION MODULE WHICH CUSTOMIZE A LINKED OBJECT STRUCTURE THAT REPRESENTS A SOFTWARE DEVELOPMENT PROJECT" (U.S. application Ser. No. 10/306,604, filed Nov. 26, 2002), and b) "SERVER COMPUTER PROGRAM HAVING AN OBJECT MODULE AND A PROCESS EXECUTION MODULE WHICH START TASKS FOR A SOFTWARE DEVELOPMENT PROJECT IN A NON-PREDICTABLE SEQUENCE" (U.S. application Ser. No. 10/306,601, filed Nov. 26, 2002). Patent applications on all of these inventions were filed concurrently on Nov. 26, 2002; and they each have the same Detailed Description, but different sets of claims.

BACKGROUND OF THE INVENTION

The present invention relates to electronic systems which are comprised of: a) multiple personal computers, each of which is used by a particular member of a software development team, b) a communication network which couples the personal computers to a server computer, and c) a computer program which the server computer executes to thereby provide various services, to the team members, for managing their development of a software product. More particularly, the present invention relates to the internal structure and operation of the computer program for the server.

In the prior art, a new software product was often produced in several sequential phases. The initial phase was a "strategy phase" where certain basic requirements for the new software product were defined and where preliminary sales forecasts were made. Next, a "feasibility phase" occurred where an engineering analysis was made to determine if the new software product was technically feasible and economically practical. Then, a "design phase" occurred where a full product specification, a full marketing plan, and related schedules were produced. Next, a "development phase" occurred where a prototype software product was produced and tested to ensure that it met the product specification. Thereafter, a "production phase" occurred where the software product was mass-produced and shipped to customers.

When the above phases are performed, it is very important that the time period from the start of the strategy phase, to the start of the production phase, be as short as possible. This is because being first to the marketplace with a new software product is a major factor in being able to acquire a large market share over the competition. Also, the price of any software product in the marketplace typically is highest when the product is initially introduced ahead of any competing product.

In order to reduce the amount of time that passes from the start of the strategy phase, to the start of the production phase, the concept of an automated workflow can be used. Three particular documents on the subject of automated workflow, which were produced by a group called the Workflow Management Coalition (WFMC), are the following: 1) WORKFLOW MANAGEMENT COALITION, THE WORKFLOW REFERENCE MODEL, DOCUMENT #TC00-1003; 2) WORKFLOW MANAGEMENT COALITION, TERMINOLOGY AND GLOSSARY DOCUMENT #WFMC-TC-1011; 3) WORKFLOW MANAGEMENT COALITION, WORKFLOW CLIENT APPLICATION (INTERFACE 2) APPLICATION PROGRAMMING INTERFACE (WAPI) SPECIFICATION, DOCUMENT #WFMC-TC-1009.

The WFMC broadly defines "workflow" as "the automation of a business process, during which documents, information, or tasks are passed from one activity to another according to a defined business process". However, when an attempt is made to automate the development of a software product by applying various mechanisms which are described in the above referenced documents, several major problems are encountered.

For example, to automate a workflow, the above documents describe "threads of control" which interconnect various "activities" with relationships that are called "OR-JOIN", "OR-SPLIT", "AND-JOIN", and "AND-SPLIT". An "OR-JOIN" relationship occurs when "two or more activity workflow branches re-converge into a single thread of control without any synchronization". An "OR-SPLIT" relationship occurs "when a single thread of control makes a decision upon which branch to take when encountered with multiple workflow branches". An "AND-JOIN" relationship occurs "when two or more parallel executing activities converge into a single common thread of control". An "AND-SPLIT" relationship occurs "when a single thread of control splits into two or more parallel activities". This is explained in reference 1) above at pages 51–52.

However, the above "AND"/"OR" relationships in an automated workflow are not sufficient to minimize the time period that occurs between the start of the strategy phase and start of the production phase in the development of a new software product. To minimize that time period, one needs to be able to automate the scheduling of all of the tasks for all of the phases in a non-fixed, non-predictable order such that each task is started as soon as certain customized entry criteria are met. In addition, to implement the relationships among the tasks and phases of a software development project, by only using "threads of control", is too restrictive.

Further, there are other factors that go beyond the mere joining of activities with automated relationships, which can reduce delays in the development of a software product. One such factor is the ability to trace a particular artifact that is generated, during one phase of the development of a software product, to other related artifacts that are generated in other phases. For example, a first artifact which defines a product requirement needs to be automatically linked to a second artifact which describes a proposal for meeting the requirement; and they need to be automatically linked to a third artifact which describes a functional design; and they need to be automatically linked to a fourth artifact which describes a technical design; and they need to be automatically linked to a fifth artifact which is the source code for the product. In addition, all of these artifacts need to be linked to respective records which show their review and approval history in order to expedite the resolution of any questions or issues which may arise. Here again the use of "threads of control" to try to accomplish all of this is too restrictive.

Also, another factor is the ability to easily share current information among members of a software development project. All artifacts which are in a software development project need to be electronically identified and electronically accessible to all members of the development team, no matter where they are located. Then, the project members can quickly get current project related information and participate in online discussions about the artifacts to resolve issues as soon as they arise.

Accordingly, a primary object of the present invention which is claimed herein is to provide a novel computer program, for use in automating the management of a software development project, which overcomes all of the above problems.

BRIEF SUMMARY OF THE INVENTION

To address all of the problems with the prior art that have been pointed out above is the BACKGROUND OF THE INVENTION, a novel system for managing the development of a software product is disclosed herein which is shown in FIG. 1. The key novel component in the FIG. 1 system is the computer program for the server computer; and in the preferred embodiment, that computer program is comprised of five modules which are: a software project definition module, a process execution module, a software development tool integration module, a collaboration module, and an object module. These modules are shown in FIG. 2. The first four modules have user interfaces that interact with the personal computers of a software development team. Those same four modules interact with the object module, through internal interfaces, to create a linked object structure that provides a framework for managing the entire software development project.

In addition however, each of the above five modules in the FIG. 2 computer program has novelty and utility by itself. Further, those five modules can be used in various novel combinations. One particular combination is the object module combined with the software development tool integration module; and, that combination is one embodiment of the invention which is claimed herein in claim 1.

More specifically, one embodiment of the invention which is covered by claim 1 is a computer-readable medium which causes a computer to operate as a server for managing the development of software by a software development team. This embodiment of the invention comprises a computer program which is stored on the computer-readable medium; and, the computer program includes an object module which instantiates a linked object structure that represents a software development project.

The linked object structure includes multiple NODE objects, that are linked to one PROJECT object, which represent respective phases of the project. Further, the linked object structure includes multiple PUBLISHED_DOCUMENT objects, that are linked to the PROJECT object, which represent respective artifacts that are generated by the team members.

Also, the computer program includes a software development tool integration module which has one interface that interacts with the object module, and has another interface that interacts over a communication network with personal computers for the team members. This software development tool integration module automatically instantiates traceability links between a particular PUBLISHED_DOCUMENT object and other object in the linked object structure, as the artifact which is represented by the particular PUBLISHED_DOCUMENT object, is generated.

The invention of claim 1 recites only the essential features of the combination of the object module and the software development tool integration module. Other additional features are added to the invention of claim 1 by the dependent claims.

BRIEF DESCRIPTION OF THE DRAWINGS

FIG. 2 shows one preferred internal structure for the computer program, which manages the development of a software product, that is shown in FIG. 1.

FIG. 3C shows still more objects on which operations are performed by the five modules in the FIG. 2 computer program.

FIG. 4B shows a second portion of the linked object structure in FIG. 4A.

FIG. 5 shows a time sequence of events in which a software project definition module and an object module in the FIG. 2 computer program create a customized linked object structure that represents a software development project, such as the linked object structure of FIGS. 4A–4B.

DETAILED DESCRIPTION

Figure 1:
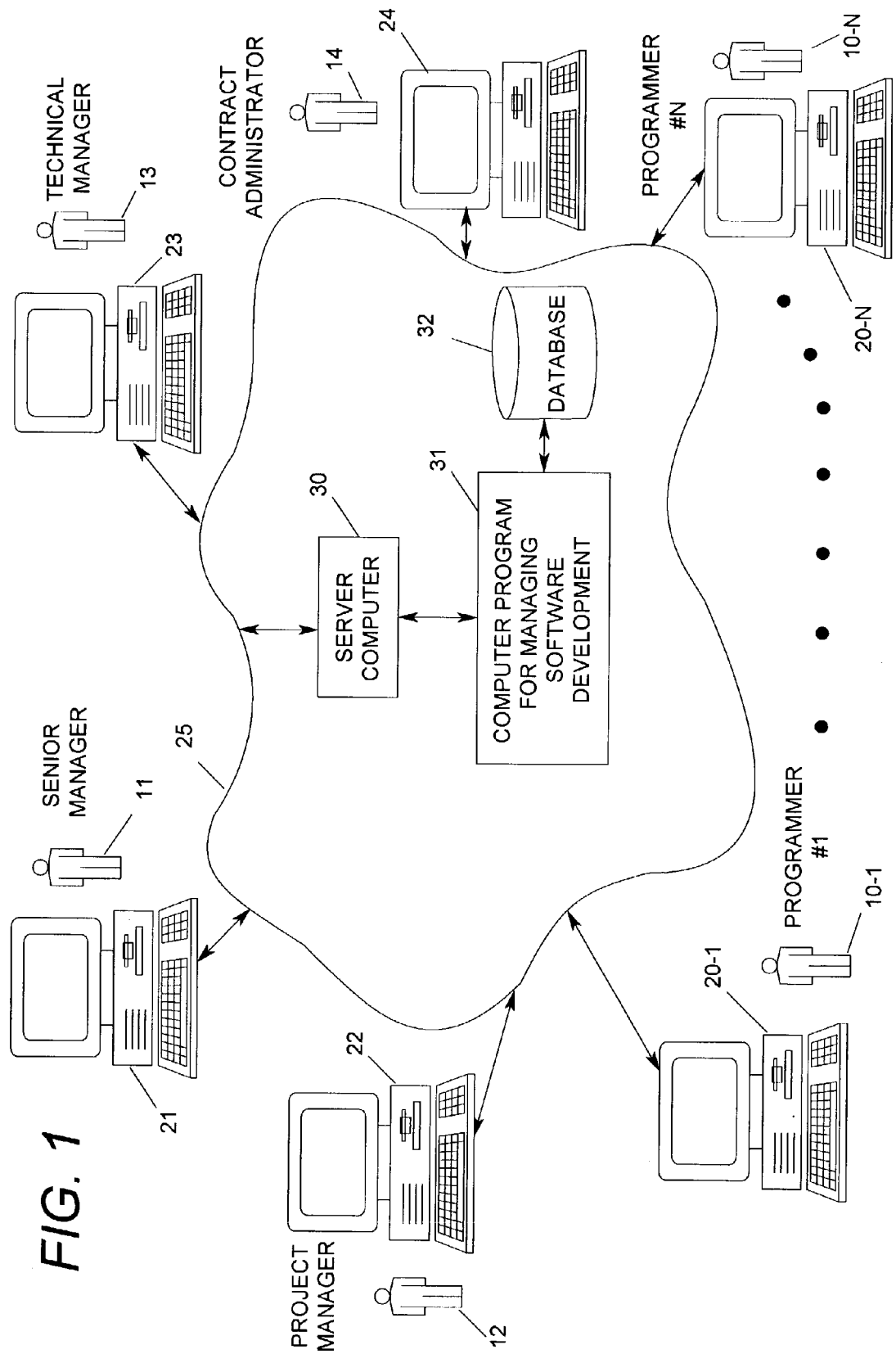
FIG. 1 shows a system which includes a computer program, for managing the development of a software product, in accordance with the present invention.

With reference now to FIG. 1, a system for managing the development of software will be described which constitutes one preferred embodiment of the present invention. The FIG. 1 system is used by a software development team, which consists of a set of programmers 10-1 thru 10-N, a senior manager 11, a project manager 12, a technical manager 13, and a contract administrator 14.

Included in the FIG. 1 system are a plurality of personal computers which are identified by reference numerals 20-1 thru 20-N, 21, 22, 23 and 24. All of these computers are interconnected by a communications network 25. The personal computers 20-1 thru 20-N are used by the programmers 10-1 thru 10-N respectively; and, the personal computers 21, 22, 23 and 24 are used by the team members 11, 12, 13 and 14 respectively.

Also included in the FIG. 1 system is a server computer 30, a computer program 31, and a database 32. The server computer 30 is coupled by the communication network 25 to all of the personal computers 20-1 thru 20-N and 21–24. This server computer 30 reads and executes the computer program 31, which is stored on a computer-readable media, such as a magnetic disc or an optical disc.

By executing the computer program 31, the server computer 30 provides several different types of management services, to the team members, in accordance with the present invention. These services are accessed and used by the team members, via a graphical user interface and a network browser on their personal computers, throughout their development of a software product. How those services are accessed and used will be described later in conjunction with FIGS. 5–8.

Next, with reference to FIG. 2, the internal make-up of the computer program 31 will be described. Included within the computer program 31 are a software project definition module 31a, a process execution module 31b, a software development tool integration module 31c, a collaboration module 31d, and an object module 31e. The first four modules 31a–31d interact with all of the personal computers on network 25 through a network interface 31f. Those same four modules 31a–31d interact with the object module 31e through internal interfaces 31g–31j respectively. The object module 31e interacts with database 32 through a database interface 31k.

Included within the software project definition module 31a are two submodules 31a-1 and 31a-2. The primary function which is performed by submodule 31a-1 is that it enables any one of several predefined software development processes to be selected and customized by a manager from his personal computer on the network 25. Each predefined software development process is represented and stored in the database 32 as a PROCESS object which is linked by a plurality of relationships to many other different types of objects. For example, one of the other objects is a NODE object which represents a phase of the PROCESS object. A typical PROCESS object will be linked to many NODE objects. Several different types of these other objects are described herein in conjunction with FIGS. 3A–3C; and, several different relationships which interlink these objects are described herein in conjunction with FIGS. 4A–4B.

The primary function which is performed by submodule 31a-2 is that it enables a PROJECT object to be created, and customized, based on the PROCESS object which was selected and customized by submodule 31a-1. When a PROJECT object is created, the PROJECT object is stored in the database 32 along with a relationship which links the PROJECT object to the selected PROCESS object. In addition, a copy of all of the objects and relationships which comprise the selected PROCESS object is stored in the database 32 along with a relationship that links the copy to the PROJECT object.

Included within the process execution module 31b are five submodules 31b-1, 31b-2, 31b-3, 31b-4 and 31b-5. The primary function which is performed by submodule 31b-1 is that it automatically sends notifications to selectable members of the software development team when certain events occur. For example, a notice is sent to a project manager when the entry criteria for starting a particular phase of a project is met. Also, a notice is sent when a task which needs to be performed in a particular phase of a project, is overdue.

Each such task is represented by a TASK object in the database 32, and each team member who is to receive a notification is represented as a PERSON object in the database 32. Also, each PERSON object has an e-mail address, as an attribute, in the database 32.

The primary function which is performed by submodule 31b-2 is that it enables any document, which is generated during the execution of a particular task, to be reviewed by selectable members of the software development team. These documents can include, for example, a product specification, a marketing plan, preliminary source code that is untested, and a plan to test the source code. Some, or all, of these documents can be stored in the database 32 as respective INTERNAL_FILE objects. Also, some or all of these documents can be stored within any of the personal computers in the FIG. 1 system; and in that case, the information which is needed to access those documents is stored in the database 32 as respective EXTERNAL_FILE objects. For each particular document that needs to be reviewed, submodule 31b-2 relates that document to a corresponding DOCUMENT_REVIEW object which in turn is linked to selectable PERSON objects which represent the team members who need to review or approve the document.

The primary function which is performed by submodule 31b-3 is that it enables the team members to perform operations on CHECKLIST objects. One or more CHECKLIST object can be incorporated into a PROJECT object via the software project definition module 31a, and each CHECKLIST object is linked to one or more CHECKLIST_ITEM objects. When a CHECKLIST_ITEM object is completed, sub-module 31b-3 enables the status of the CHECKLIST_ITEM object to be changed by a team member. Also, when all of the CHECKLIST_ITEM objects are complete, then the submodule 31b-3 automatically marks the status of the CHECKLIST object as complete.

The primary function which is performed by submodule 31b-4 is that it enables the team members to perform operations on CRITERIALIST objects. A CRITERIALIST object is used to define entry criteria and exit criteria for any phase of a project that is represented by a corresponding NODE object. To define the entry criteria, a first type of linkage is made between the CRITERIALIST object and one selectable set of CRITERIA_ITEM objects. To define the exit criteria, a second type of linkage is made between the CRITERIALIST object and another selectable set of CRITERIA_ITEM objects.

When a team member completes a task, he uses his personal computer to indicate to submodule 31b-4 that the task is done. In response, submodule 31b-4 changes the status of the corresponding CRITERIA_ITEM object to "complete". When the status of all of the CRITERIA_ITEM objects is "complete" in the set which defines the entry criteria, then submodule 31b-4 automatically marks the status of the corresponding NODE object to "entry criteria met". Similarly, when the status of all of the CRITERIA_ITEM objects is "complete" in the set which defines the exit criteria, then submodule 31b-4 automatically marks the status of the corresponding NODE object to "exit criteria met".

The primary function which is performed by submodule 31b-5 is that it periodically checks the status of the TASK objects that are linked to the PROJECT object which was selected and customized by submodules 31a-1 and 31a-2. If certain conditions are met, then submodule 31b-5 automatically sends a notification to the appropriate team member. For example, submodule 31b-5 detects if a task, as defined by a TASK object, is overdue; and in that event it sends a notification to the team member who is responsible for performing the task. The text of the notification comes from a NOTIFICATION object.

Included within the software development tool integration module 31c are three submodules 31c-1, 31c-2 and 31c-3. The primary function which is performed by submodule 31c-1 is that it associates the artifacts which are created by the team members, as they participate in their project, to a) the corresponding members who created those artifacts, b) the identity of the tools that were used to create the artifacts, and c) how the artifacts can be accessed via the communication network 25. Some examples of the artifacts which can be created are functional specifications, source code, and test documents. Each of these artifacts can be represented by an INTERNAL_FILE object, or an EXTERNAL_FILE object, or a PUBLISHED_DOCUMENT object. Any desired software development tool can be used to create the artifacts. Some examples of these tools are MS Office, Rational Rose, MS Visual Studio, Visual Café, Mercury Winrunner, MS Project and Rational RequisitePro. As each artifact is produced, the artifact is linked by submodule 31c-1 to an address for accessing the artifact on the communication network 25, the team members who created the artifact, and to the tools which were used to create the artifact.

The primary function which is performed by submodule 31c-2 is that it associates each artifact which is created by the team members, as they participate in their project, to several different types of objects which relate to the type of activity that is being performed. Those objects include the TASK object, the NODE object, and the PROJECT object.

The primary function which is performed by submodule 31c-3 is that it associates each artifact which is created by the team members, as they participate in their project, to any related artifacts that were previously created in the project. For example, if the team members first create untested source code that is represented by an EXTERNAL_FILE object, and subsequently create a test procedure for testing the source code which is represented by a PUBLISHED_DOCUMENT object, then submodule 31c-3 will link the PUBLISHED_DOCUMENT object to the EXTERNAL_FILE object.

Included within the collaboration module 31d are three submodules 31d-1, 31d-2, and 31d-3. The primary function which is performed by submodule 31d-1 is that it permits only selected team members to view and/or change certain documents. For example, each document which needs to be reviewed is linked to one or more REVIEWER objects. Submodule 31d-1 ensures that no team member who is not represented by one of the REVIEWER objects takes part in the review.

The primary function which is performed by submodule 31d-2 is that it records all electronic messages, which get passed among the team members, when they conduct a review of a particular document. Each document which needs to be reviewed is linked to one or more REVIEWER objects, and each team member who is represented by one of the REVIEWER objects can participate in the review. When the review occurs, each reviewer uses his personal computer to post discussion items and write replies to discussion items posted by other reviewers. The author also uses his personal computer to read and reply to the discussion items. All of these discussion items and the corresponding replies are recorded by submodule 31d-2.

The primary function which is performed by submodule 31d-3 is that it records the extent to which a document has been reviewed and approved. Each document which needs to be reviewed is linked to one or more REVIEWER objects; and, each team member who is represented by one of the REVIEWER objects interacts with submodule 31d-3 through his personal computer to record the status of his review of the document as "reviewed", "not reviewed", "approved", or "not approved".

Included within the object module 31e is an object access submodule 31e-1 and an object model 31e-2. The primary function which is performed by submodule 31e-1 is that it services CALLS, which are sent from the modules 31a–31d, to perform various operations that involve the objects. For example, submodule 31e-1 services CALLS to read, write, create, and delete the objects and their attributes. Also, submodule 31e-1 services CALLS to read the names of all PROJECT objects, read the names of all PERSON objects who are linked to a particular ROLE object, read all of the attributes of a particular object, and read all of the traceability links of an object. Further, submodule 31e-1 services CALLS to link one object to another object. All of the objects and their interrelations are stored in the database 32. Only submodule 31e-1 knows how to read an object from the database 32, write an object into the database 32, create an object in the database 32, delete an object in the database 32, and change the interrelations among the objects.

Figure 3A:
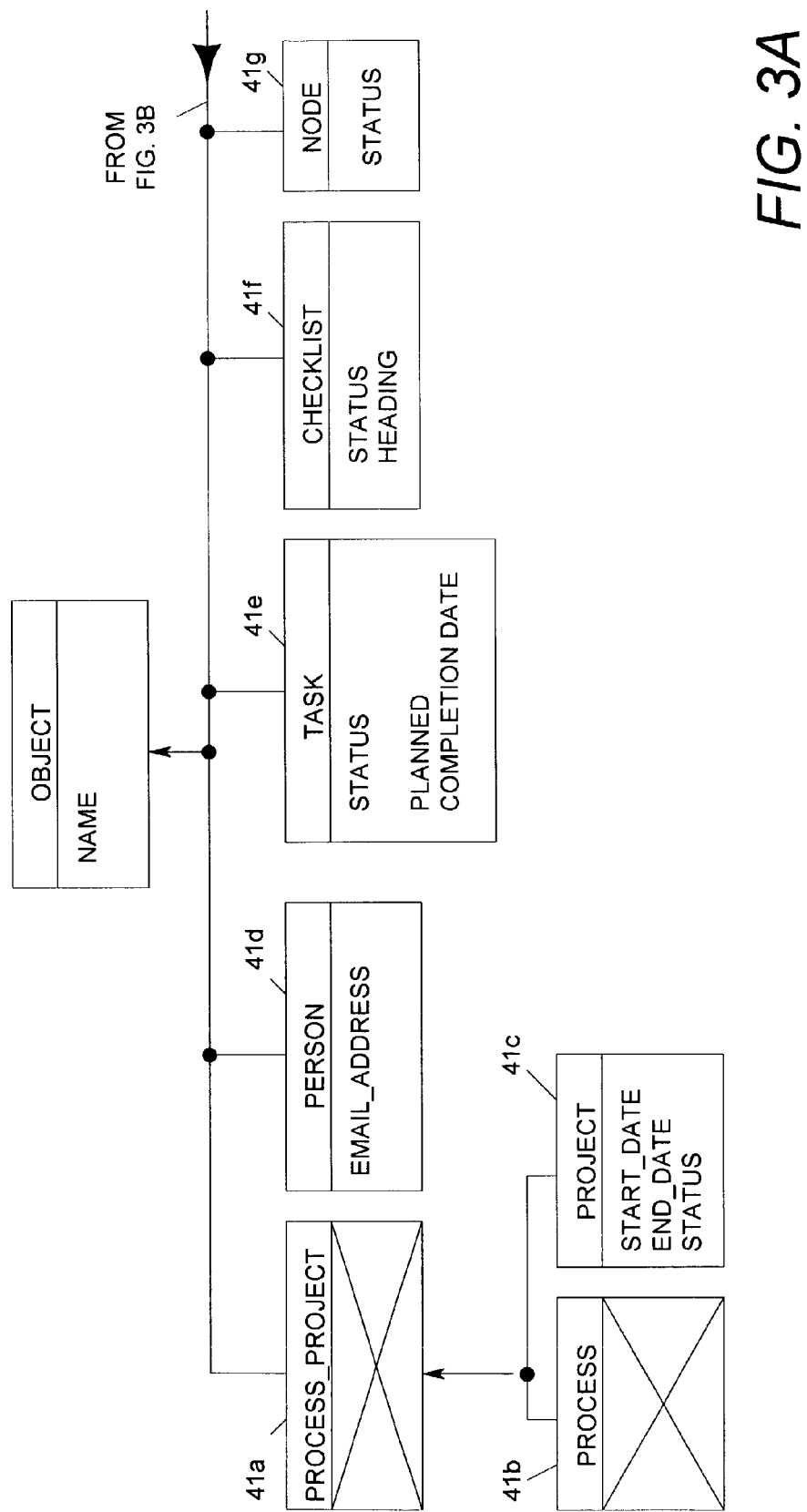
FIG. 3A shows several types of objects on which operations are performed by five different modules in the computer program of FIG. 2.
Figure 3B:
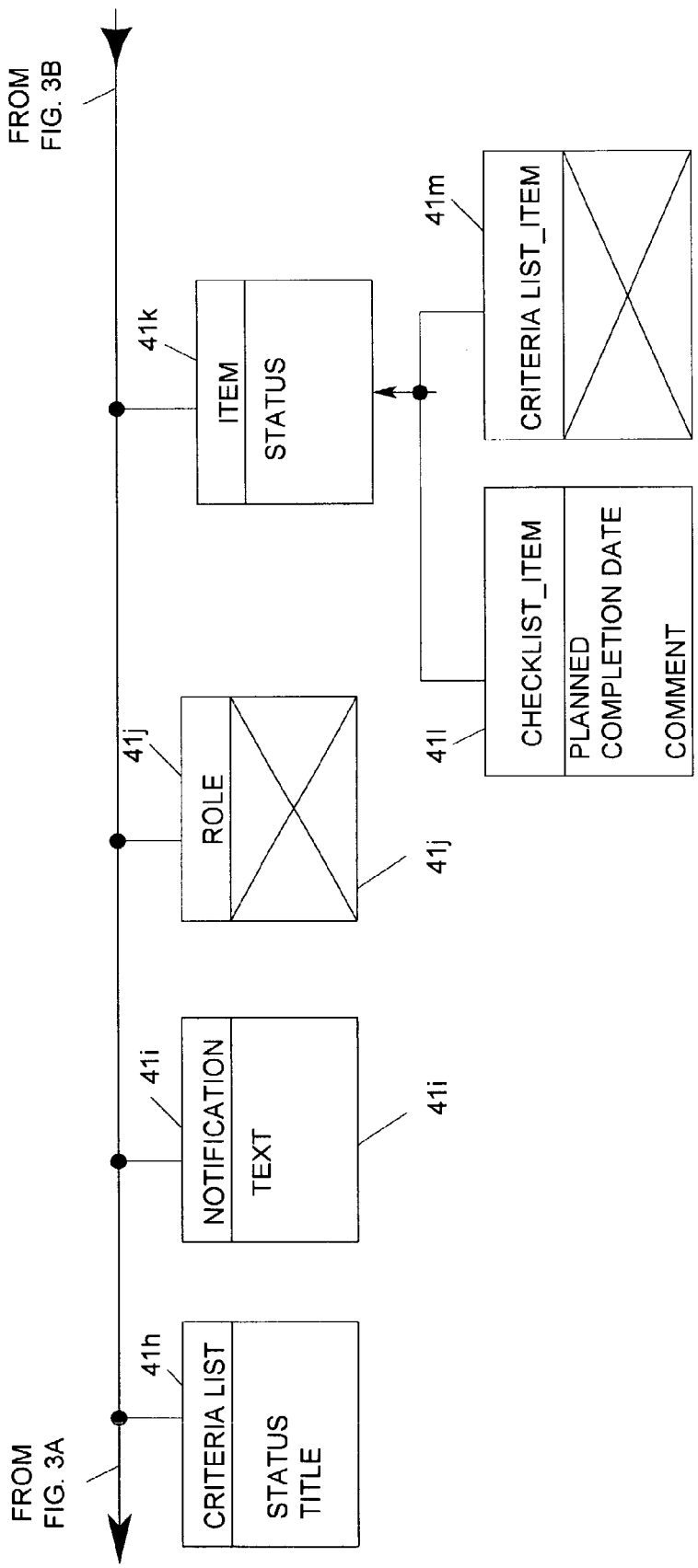
FIG. 3B shows additional objects on which operations are performed by the five modules in the FIG. 2 computer program.

The primary function which is performed by the object model 31e-2 is that it defines all of the different types of objects that are in the database 32 as well as their attributes, the operations which can be performed on the objects, and the interrelationships which can be created among the objects. One portion of the object model 31e-2 is shown in FIGS. 3A–3C. Each different type of object that is shown in those figures is identified below in TABLE 1 by its name and corresponding reference number.

TABLE 1

| REF. NUMBER | OBJECT NAME |
| --- | --- |
| 41a | PROCESS_PROJECT |
| 41b | PROCESS |
| 41c | PROJECT |
| 41d | PERSON |
| 41e | TASK |
| 41f | CHECKLIST |
| 41g | NODE |
| 41h | CRITERIALIST |
| 41i | NOTIFICATION |
| 41j | ROLE |
| 41k | ITEM |
| 41l | CHECKLIST_ITEM |
| 41m | CRITERIALIST_ITEM |
| 41n | PUBLISHED_DOCUMENT |
| 41o | FILE |
| 41p | EXTERNAL_FILE |
| 41q | INTERNAL_FILE |
| 41r | DOCUMENT_REVIEW |
| 41s | TOOL |
| 41t | REVIEWER |

The portion of the object model which is shown in FIGS. 3A–3C is in the form of an inheritance tree from which a respective set of attributes for each of the objects 41a–41t can be determined. Those attributes which any particular object "X" has consist of: a) all of the attributes that are listed directly below the object's name, and b) all of the attributes of any other object "Y" which is linked to the object "X" at a higher location in the inheritance tree.

An object "Y" has a higher location in the inheritance tree than an object "X" if the object "Y" can be reached from the object "X" by travelling only in the direction of the arrows on the lines which link those two objects. For example, FIG.

3B shows that the attributes of the CHECKLIST_ITEM object 411 consist of a PLANNED COMPLETION DATE, COMMENT and STATUS; and, the latter attribute is inherited from the ITEM object 41k.

By using the software project definition module of FIG. 2, a particular instantiation of a PROJECT object is created in the database 32 as a customized set of the objects from FIGS. 3A–3C, together with a set interrelationships among the objects. Each instantiation of a NODE object represents a respective phase of the customized PROJECT object. Also, the NODE objects can have selectable relationships to the TASK objects, CHECKLIST objects, CRITERIALIST objects, and other NODE objects.

Each CRITERIALIST object, which is linked to a NODE object, has links to one or more CRITERIALIST_ITEMS that define selectable criteria for starting and/or ending the phase of a project which the linked NODE object represents. Also, each CHECKLIST object, which is linked to a NODE object, has links to one or more CHECKLIST_ITEM objects. Each CHECKLIST_ITEM object represents a task which has a planned completion date, and a notice is sent to selected team members if the planned completion date is not met.

FIGS. 3A–3C show that the status attribute occurs in all of the following objects: PROJECT, TASK, CHECKLIST, NODE, CRITERIALIST, CHECKLIST_ITEM, CRITERIALIST_ITEM, and REVIEWER. When the project begins, the status attribute in each of the above objects has an initial state. Then, as the project is carried out, the state of each status attribute is changed by the process execution module 31b and the collaboration module 31d. For example, the status of a CRITERIALIST_ITEM is initially "incomplete". Thereafter, that status is changed to "complete" by module 31b when the task which the CRITERIALIST_ITEM represents, is finished. All of the different states for the status attribute of each object are listed below in TABLE 2.

TABLE 2

| OBJECT NAME | STATUS ATTRIBUTE |
|---|---|
| PROJECT | constructed/running/complete |
| TASK | incomplete/complete |
| CHECKLIST | incomplete/complete |
| NODE | not entered/entry complete/exit complete |
| CRITERIALIST | incomplete/entry complete/exit complete |
| CHECKLIST_ITEM | incomplete/complete |
| CRITERIALIST_ITEM | incomplete/complete |
| REVIEWER | approved/not approved if TYPE is approver |
|  | reviewed/not reviewed if TYPE is reviewer |

Figure 4A:
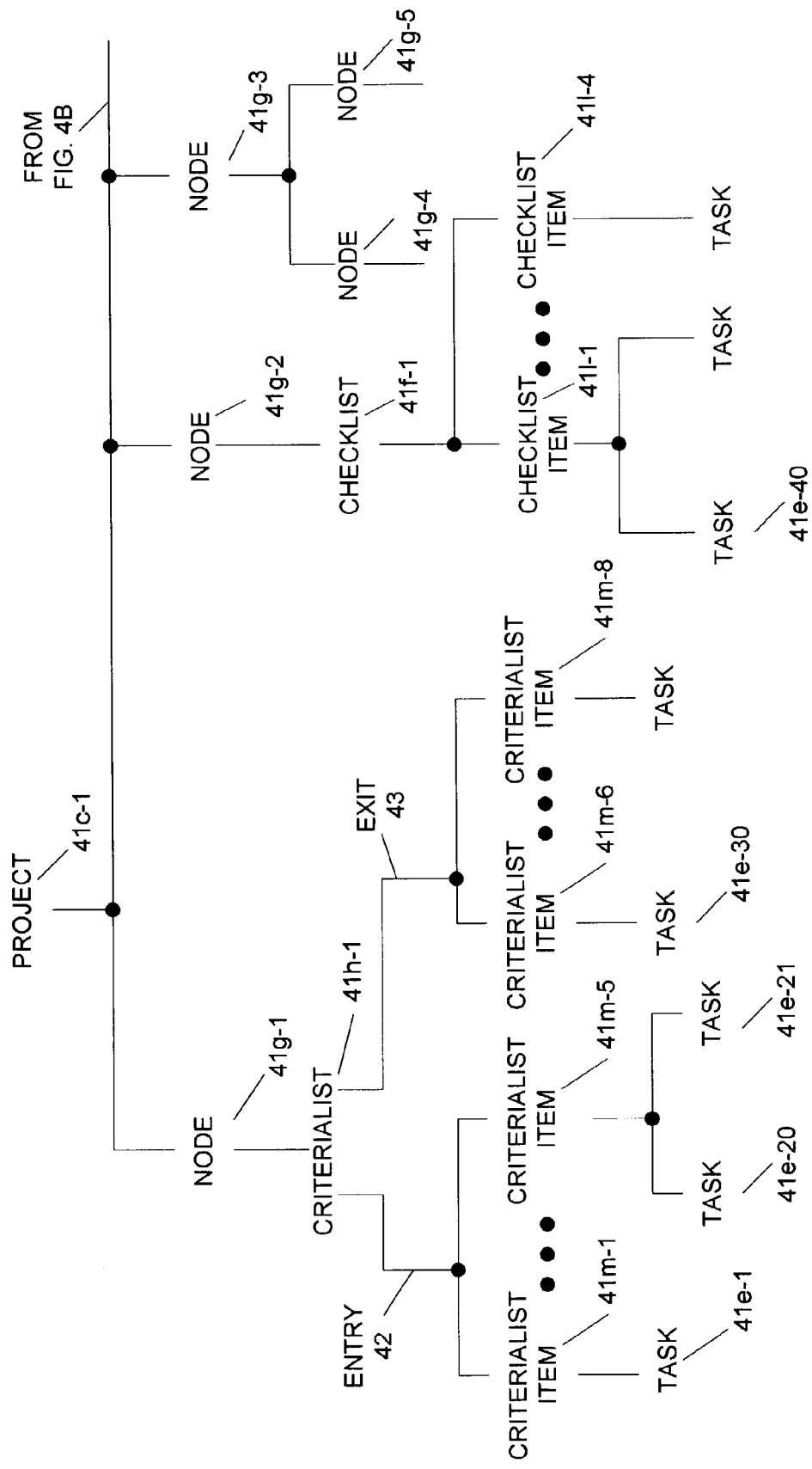
FIG. 4A shows one portion of a linked object structure in which the objects of FIGS. 3A–3C are related, by the five modules in the FIG. 2 computer program, to represent a software development project.

One specific example of a particular PROJECT object, and its interrelationships to other objects, is shown in FIGS. 4A–4B. All of the objects that are shown in FIGS. 4A–4B are particular instantiations of the corresponding types of objects that are shown in FIGS. 3A–3C. In FIGS. 4A–4B, the i-th instantiation of any object X has the same reference numeral as the corresponding object type in FIGS. 3A–3C followed by "-i".

PROJECT object 41c-1 in FIGS. 4A–4B is linked directly to three NODE objects 41g-1, 41g-2, and 41g-3. In addition, the PROJECT object 41c-1 is linked directly to two ROLE objects 41j-1 and 41j-2, one PUBLISHED_DOCUMENT object 41n-1, and two NOTIFICATION objects 41i-1 and 41i-2.

NODE object 41g-1 is linked directly to one CRITERIALIST object 41h-1 which in turn has an entry type of linkage 42 directly to five CRITERIALIST_ITEM objects 41m-1 thru 41m-5. This means that all five of the CRITERIALIST_ITEM objects 41m-1 thru 41m-5 must be met in order to start the phase of the project that is represented by the NODE object 41g-1.

CRITERIALIST_ITEM object 41m-1 is linked directly to one TASK object 41e-1. This means that the CRITERIALIST_ITEM object 41m-1 consists of just that one TASK object 41e-1. Similarly, the CRITERIALIST_ITEM object 41m-5 is linked directly to two TASK objects 41e-20 and 41e-21; and this means that the CRITERIALIST_ITEM object 41m-5 consists of the two TASK objects 41e-20 and 41e-21.

The CRITERIALIST object 41h-1 also has an exit type of link 43 directly to three CRITERIALIST_ITEMS 41m-6 thru 41m-8. This means that all three of the CRITERIALIST_ITEMS 41m-6 thru 41m-8 must be met in order to end the phase of the process that is represented by the NODE object 41g-1.

NODE object 41g-2 is linked directly to one CHECKLIST object 41f-1, which in turn is linked directly to four CHECKLIST_ITEM objects 411-1 thru 411-4. This means that the phase of the project which is represented by the NODE object 41g-2 requires all four of the CHECKLIST_ITEM objects 411-1 thru 411-4 to be completed.

NODE object 41g-2 can also be linked to one CRITERIALIST object in a manner that is similar to the linkage which is shown for the NODE object 41g-1. This linkage for the NODE object 41g-2 is not shown since it is repetitive.

NODE object 41g-3 is linked directly to two other NODE objects 41g-4 and 41g-5. This means that the phase of the PROJECT 41c-1 which is represented by NODE object 43g-3 is partitioned into two subphases that are represented by NODE object 43g-4 and NODE object 43g-5. Similarly, NODE object 41g-3 could be linked directly to more than two other NODE objects; and, any of those NODE objects can be linked directly to one or more additional NODE objects, as desired. Each of the above NODE objects can be linked directly to other objects in a manner that is similar to the linkage which is shown for NODE object 41g-1 and NODE object 41g-2. Here again, the linkage for the NODE objects 41g-4 and 41g-5 is not shown to avoid repetition and over complication of FIG. 4A.

ROLE object 41j-1 is linked directly to ten PERSON objects 41d-1 thru 41d-10. This means that all of the PERSON objects 41d-1 thru 41d-10 represent team members who share the same role in the PROJECT object 41c-1. For example, each of the PERSON objects 41d-1 thru 41d-10 could represent a PROGRAMMER.

ROLE object 41j-2 is linked directly to only one PERSON object 41d-11. This means that the PERSON object 41d-11 represents a team member who has a unique role in the PROJECT object 41c-1. For example, the PERSON object 41d-11 could represent a SENIOR MANAGER.

PUBLISHED_DOCUMENT object 41n-1 is linked directly to one EXTERNAL_FILE object 41p-1 and one DOCUMENT_REVIEW object 41r-1. This means that: a) the document which is represented by the PUBLISHED_DOCUMENT object 41n-1 is stored in a file that is represented by the EXTERNAL_FILE object 41p-1 and is accessed over the communication network 25; and, b) the document needs to be subjected to a review which is represented by the DOCUMENT_REVIEW object 41r-1.

DOCUMENT_REVIEW object 41r-1 is linked directly to three REVIEWER objects 41t-1 thru 41t-3, which in turn are linked directly to three PERSON objects 41d-1, 41d-10, and 41d-11 respectively. This means that the document which is represented by the PUBLISHED_DOCUMENT object 41*n*-1 needs to be reviewed by each of the team members who are represented by the PERSON objects 41*d*-1, 41*d*-10, and 41*d*-11.

NOTIFICATION object 41*i*-1 is linked to a single PERSON object 41*d*-11. This means that the team member who is represented by the PERSON object 41*d*-11 needs to be sent a message with text that is specified by the NOTIFICATION object 41*i*-1. Similarly, NOTIFICATION object 41*i*-2 is linked to one ROLE object 41*j*-1 and one PERSON object 41*d*-10. This means each team member who is represented by a PERSON object which is linked to the ROLE object 41*j*-1, plus the team member who is represented by the PERSON object 41*d*-10, needs to be sent a message with text that is specified by the NOTIFICATION object 41*i*-2.

Also shown in FIG. 4B are several links which are illustrated with dashed lines. These dashed lines represent traceability links from an artifact that is produced when the project is carried out, to other things in the project. By comparison, the solid lines in FIGS. 4A–4B represent links within the structure of the project itself.

For example, in FIG. 4B, suppose that the EXTERNAL_FILE object 41*p*-1 represents a file which stores an artifact A1. Then the traceability link to the PERSON object 41*d*-1 indicates that artifact A1 was authored by the person which object 41*d*-1 represents. Similarly, the traceability link to the TASK object 41*e*-40 indicates that artifact A1 was produced during the performance of a task which object 41*e*-40 represents. Also, the traceability link to the NODE object 41*g*-2 indicates that artifact A1 was produced in the phase of the project which object 41*g*-2 represents.

Likewise, the traceability link to the TOOL object 41*s*-1 indicates that artifact A1 was generated by use of the software development tool which object 41*s*-1 represents. Further, the traceability link to the two EXTERNAL_FILE objects 41*p*-2 and 41*p*-3 indicate that artifact A1 is related in subject matter to two other artifacts which are stored in external files that objects 41*p*-2 and 41*p*-3 represent. For example, artifact A1 could be a proposal for implementing a software design specification that is stored in the file which object 41*p*-2 represents.

Next, with reference to FIGS. 5–8, a time sequence of events will be described which illustrates one specific scenario of how the modules 31*a*–31*e* of FIG. 2 are used to manage the development of a software product. During this scenario, the modules 31*a*–31*e* create many instantiations of the objects in FIGS. 3A–3C and many interrelationships among those objects, such as the relationships of FIGS. 4A and 4B.

However, the personal computers for the members of the software development team do not directly display the objects and their interrelationships which are stored in the database 32. Instead, the personal computers for the members of the software development team display graphical symbols and/or words which the modules 31*a*–31*e* represent as interrelated objects in the database 32.

The events that are shown at times t1–t6 in FIG. 5 occur when a particular software development project, Project-X, is initially being defined. In FIG. 5, the project manager 12 uses his personal computer 22 to define Project-X by interacting with the software project definition module 31*a* which in turn interacts with the object module 31*e*.

At time t1 in FIG. 5, the manager 12 selects one of several predefined software development processes. To do this, the manager 12 first uses his personal computer 22 to ask for a display of the names of all of the predefined processes which he has to chose from. In response, submodule 31*a*-1 sends a CALL to the object access submodule 31*e*-1 which requests the names of all PROCESS objects 41*b* that are stored in the database 32. Those requested names are then returned by submodule 31*e*-1 to submodule 31*a*-1, which in turn sends the names to the manager's personal computer 22.

Thereafter, the manager 12 uses his personal computer 22 to select one of the process names that he received. Then the manager 12 can ask for a display of any internal portion of the selected process. Each such request is serviced by the submodules 31*a*-1 and 31*e*-1 in the same manner that was described above, except that different information is requested in each CALL which submodule 31*a*-1 sends to the object access module 31*e*-1. This interaction continues until the manager 12 finds one predefined process which approximates the own unique requirements of his development project.

Next, at time t2, the manager 12 adds a checklist to the predefined process which he selected at time t1. To do this, the manager 12 uses his personal computer 22 to identify one particular phase of the selected process and to indicate that the checklist is to be added at that phase. In response, submodule 31*a*-1 sends a CALL to the object access submodule 31*e*-1 which requests that: a) an instantiation of a CHECKLIST object 41*f* be created in the database 32, and b) a link be created in the database 32 between the CHECKLIST object 41*f* and the NODE object 41*g* which represents the particular phase that the manager 12 identified. Then, the manager 12 uses his personal computer 22 to define various items, as desired, that go into the checklist. For each such item, submodule 31*a*-1 sends a CALL to the object access submodule 31*e*-1 which requests that: a) an instantiation of a CHECKLIST_ITEM object 41*l* be created in the database 32, and b) a link be created in the database 32 between the CHECKLIST_ITEM object 41*l* and the CHECKLIST object 41*f*.

Next, at time t3 in FIG. 5, the manager 12 creates a "project" which will be accessible by only the members of his software development team. By comparison, each PROCESS object 41*b*, and its interrelated objects, are accessible by many other non-team members (not shown in FIG. 1) who have personal computers that are coupled to the server computer 30 via the communication network 25. For example, the network 25 could be coupled to every personal computer that is in a large corporation which employs the team members; and, all of the engineers in the corporation could have permission to view the PROCESS objects 41*b* and their interrelated objects.

To create his project, the manager 12 uses his personal computer 22 to identify the particular process which he changed at time t2, and to indicate that he wants to create a corresponding project. In response, submodule 31*a*-2 sends a CALL to the object access submodule 31*e*-1 which requests that: a) an instantiation of a PROJECT object 41*c* be created in the database 32, b) a link be created between that PROJECT object 41*c* and the PROCESS object 41*b* which the manager 12 identified; and c) all of the objects that are linked to the PROCESS object 41*b* be copied and linked in the same way to the PROJECT object 41*c*.

Next, at time t4, the manager 12 uses his personal computer 22 to identify all of the team members who he wants to participate in his project. To perform this task, the manager 12 first uses his personal computer 22 to request a list of all of the different roles that are in his project, along with a list of all of the individuals who he can assign to those roles. In response, submodule 31*a*-2 sends CALLS to the object access submodule 31*e*-1 which requests: a) the names of all of the ROLE objects 41*j* that are linked to the PROJECT object 41c which was created at time t3, and b) the names of all of the PERSON objects 41d in the database 32. These names are sent from submodule 31e-1 to submodule 31a-2, which in turn sends them to the personal computer 22 of the manager 12. Then the manager 12 uses his personal computer 22 to view the names and assigns one or more of the named individuals to each role. For each assignment that is made, submodule 31a-2 sends a CALL to the object access submodule 31e-1 which requests that a link be made between the corresponding PERSON object 41d and corresponding ROLE object 41j.

As an example, in FIG. 4B, the ROLE object 41j-1 could represent the role of a software development programmer; and then, the ten linked PERSON objects 41d-1 thru 41d-10 would represent respective programmers. Also in FIG. 4B, the ROLE object 41j-2 could represent the role of a project manager; and then the linked PERSON object 41d-11 would represent the project manager.

Next, at time t5, the manager 12 modifies the criteria for starting and/or ending a particular phase of his project. To do this, the manager 12 uses his personal computer 22 to identify the phase of the project which he wants to change. In response, submodule 31a-2 sends a CALL to the object access submodule 31e-1 to read the current entry criteria and exit criteria for the NODE object that represents the identified project phase. Each CRITERIALIST_ITEM object which is linked to the NODE object is sent to submodule 31a-2, along with an indication of whether that item defines entry or exit criteria. Submodule 31a-2 then sends this information, in a different format, to the personal computer 22 of the manager 12. Then, the manager 12 uses his personal computer 22 to identify: a) any existing CRITERIALIST_ITEM that is to be deleted, b) any additional criteria which he wants to met, before the project phase starts, and c) any additional criteria which he wants to be met before the project phase ends.

Each time the manager 12 indicates that an existing criteria for entering or exiting the project phase is to be deleted, submodule 31a-2 sends a CALL to the object access submodule 31e-1 which requests that the corresponding CRITERIALIST_ITEM object 41m, and its interrelationships, be deleted in the database 32. Each time the manager 12 indicates that a new criteria for entering or exiting a project phase is to be added, submodule 31a-2 sends a CALL to the object access submodule 31e-1 which requests that a new corresponding CRITERIALIST_ITEM object 41m and its interrelationships be created.

In FIG. 5, the sequence of events which is shown to select and customize the project ends at time t5. However, that sequence is only one illustrative example. The manager 12 can interact with the submodules 31a-1 and 31a-2 as he desires until he produces a customized project that meets his requirements. That customized project 41c will be represented by a corresponding PROJECT object in the database 32 as instantiations of the objects 41a–41t of FIGS. 3A–3C plus their interconnections.

Next, with reference to FIG. 6, the events which are shown at times t10–t16 will be described. Here it is assumed that the project which was customized in FIG. 5 is now being carried out. Note that a time gap occurs between time t5 of FIG. 5 and time t10 of FIG. 6, and many other events which are not shown can occur in that gap.

Figure 6:
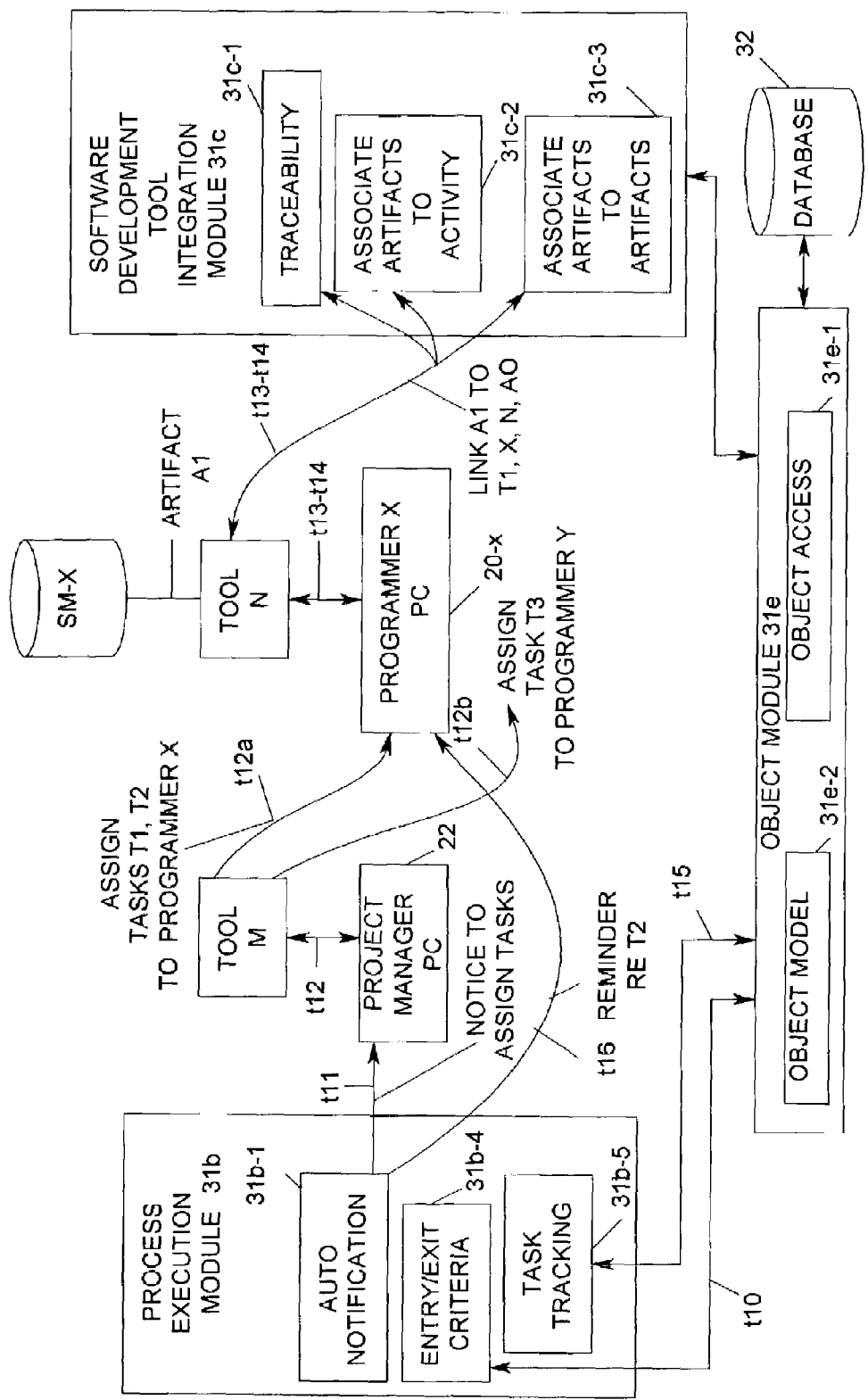
FIG. 6 shows a time sequence of events in which a process execution module, a software development tool integration module, and a object module in the FIG. 2 computer program, sense certain entry criteria to start a particular phase, send a notice to assign tasks, sense an overdue task, send a reminder notice, and link an artifact to various other objects in the linked object structure.

At time t10 in FIG. 6, submodule 31b-4 senses that a status change has occurred in a CRITERIALIST object 41h that is in the project. This status change in the CRITERIALIST object 41h indicates that a particular phase of the project should now begin, or should now end. That particular phase is represented by a NODE object 41g which is linked to the CRITERIALIST object 41h and one or more CRITERIALIST_ITEM objects 41m, just like the linkage that is shown for the NODE object 41g-1 in FIG. 4A.

Each CRITERIALIST_ITEM object 41m is linked to one or more TASK objects 41e; and when a team member finishes one of those tasks, he uses his personal computer to indicate to the server computer 30 in FIG. 1 that the task is complete. In response, submodule 31b-4 sends a CALL to the object access submodule 31e-1 which requests that the status of the corresponding CRITERIALIST_ITEM object 41m be changed to "complete". Then, submodule 31b-4 sends a CALL to the object access submodule 31e-1 which asks to read the status of all of the CRITERIALIST_ITEM objects 41m that have an entry type of linkage 42, or an exit type of linkage 43, to the CRITERIALIST object 41h.

If the status of "complete" occurs in all of the CRITERIALIST_ITEM objects 41m which have the entry type linkage 42, then submodule 31b-4 sends a CALL to the object access submodule 31e-1 which requests that the status of the CRITERIALIST object 41h be set to "entry complete". Then submodule 31b-4 CALLS submodule 31b-1 to indicate that this status change took place, and to identify the particular phase of the project where the status change occurred. Similarly, if the status of "complete" occurs in all of the CRITERIALIST_ITEM objects 41m which have the exit type linkage 43, then submodule 31b-4 sends a CALL to the object access submodule 31e-1 which requests that the status of the CRITERIALIST object 41h be set to "exit complete". Then submodule 31b-4 CALLS submodule 31b-1 as described above.

In response to the above described change in status, submodule 31b-1 sends a notice to the manager's personal computer 22 which advises him that he needs to start certain tasks in his project. This occurs at time t11. The text of the notice comes from one particular NOTIFICATION object 41i which is linked to the PROJECT object 41c. That particular NOTIFICATION object 41i has a name, such as "START NEW PHASE" to indicate that its text should be sent when a new phase begins. Also, the text has a placeholder for the name of the NODE object 41g which represents the phase of the project where the status change occurred.

Each team member who is to receive a particular notice is identified directly by a PERSON object 41d, or indirectly by a ROLE object 41j, that is linked to the one NOTIFICATION object 41i which contains the text of the notice. A notice to a single person is illustrated in FIG. 4B by the NOTIFICATION object 41i-1 which is linked to just a single PERSON object 41d-11. A notice to multiple persons is illustrated in FIG. 4B by the NOTIFICATION object 41i-2 which is linked to one ROLE object 41j-1 plus one PERSON object 41d-11. Each PERSON object 41d which is linked directly to a NOTIFICATION object 41i, or linked indirectly to a NOTIFICATION object 41i through a ROLE object 41j, has an e-mail address as an attribute of where the notice is to be sent.

Next, at time t12, the manager 12 uses a tool M on his personal computer 22 to send task assignment notices to various members of his software development team. In FIG. 6, the time t12 is partitioned into two parts t12a and t12b. Programmer X is sent a notice at time t12a to perform two tasks T1 and T2; and, programmer Y is sent a notice at time t12b to perform one task T3. Each of the tasks T1–T3 is represented in the database 32 by a TASK object 41e; and they in turn are linked to the NODE object 41g which represents the phase of the project that started at time t10.

Next, during the time period t13–t14, the programmer X uses a tool N on his personal computer to perform the task T1. In performing this task, an artifact A1 is created which is stored as a file in a storage module SM-X, such as a magnetic disc, which is shown in FIG. 6 as being connected directly to the personal computer of the programmer X.

At any selectable time during the time period t13–t14, the programmer X can interact with submodule 31c-1 to indicate that the artifact A1 is sufficiently complete to be viewed by other team members. Then in response, submodule 31c-1 CALLS the object module 31e to request: 1) that an EXTERNAL_FILE object 41p be created, in the database 32, which represents the artifact A1; and 2) that a PUBLISHED_DOCUMENT object 41n be created in the database 32 which links the above EXTERNAL_FILE object 41p to the PROJECT object 41c for the current project. An example of this structure is shown in FIG. 4B by the objects 41n-1 and 41p-1. One attribute of the EXTERNAL_FILE object 41p is the address for accessing the artifact A1 from the file on the storage module SM-X.

Also during the time period t13–t14, the submodules 31c-1, 31c-2, and 31c-3 generate various traceability links to the artifact A1. In particular, submodule 31c-1 links the EXTERNAL_FILE object 41p which represents the artifact A1, to the PERSON object 41d that represents the programmer X who created the artifact, and to the TOOL object 41s which represents the tool N that was used. Submodule 31c-2 links the object which represents the artifact A1, to the TASK object 41e that represents the task T1 which was being performed, the NODE object 41g which represents particular phase of the project which includes the task T1, and the PROJECT object 41c which represents the project itself. Submodule 31c-3 links the object which represents artifact A1 to any other object that represents another artifact which was previously created in the project and is related to the artifact A1. One such artifact is indicated in FIG. 6 as A0.

The above traceability links for the artifact A1 are similar to those which are shown by the dashed lines from the EXTERNAL_FILE object 41p-1 in FIG. 4B. One way to create these links is by having the submodules 31c-1, 31c-2, and 31c-3 interact first with programmer X, via his personal computer 20-X, to request the identity of all of the things that are related to the artifact A1. Thereafter, the submodules 31c-1, 31c-2, and 31c-3 create the traceability links by making CALLS to the object access submodule 31e-1 which specify the objects that need to be linked to the artifact A1. Alternatively, the traceability links which are shown by the dashed lines in FIG. 4B can be created at different times and automatically by the submodules 31c-1, 31c-2 and 31c-3 without interaction with the programmer X.

Next, at time t15 in FIG. 6, the submodule 31b-5 senses that the performance of the task T2 is overdue. This is done by periodically comparing the planned completion data for each task in a particular a project against the current date. In the database 32, the planned completion date is an attribute of the TASK object 41e.

When the overdue task is sensed, submodule 31b-5 CALLS submodule 31b-1 to indicate that the task is overdue. Then in response, submodule 31b-1 sends a reminder to the personal computer 20-X of the programmer X. This occurs at time t16 in FIG. 6. The text of the reminder is given by a NOTIFICATION object 41i in the database 32. The address on the network 25 of where the reminder is to be sent is given in the database 32 as an attribute of a PERSON object 41j which is linked to the NOTIFICATION object 41i.

Next, with reference to FIG. 7, the events which are shown at times t21–t26 will be described. Here again, a time gap occurs between time t16 of FIG. 6 and time t21 of FIG. 7, and many other events which are not shown can occur in that gap.

Figure 7:
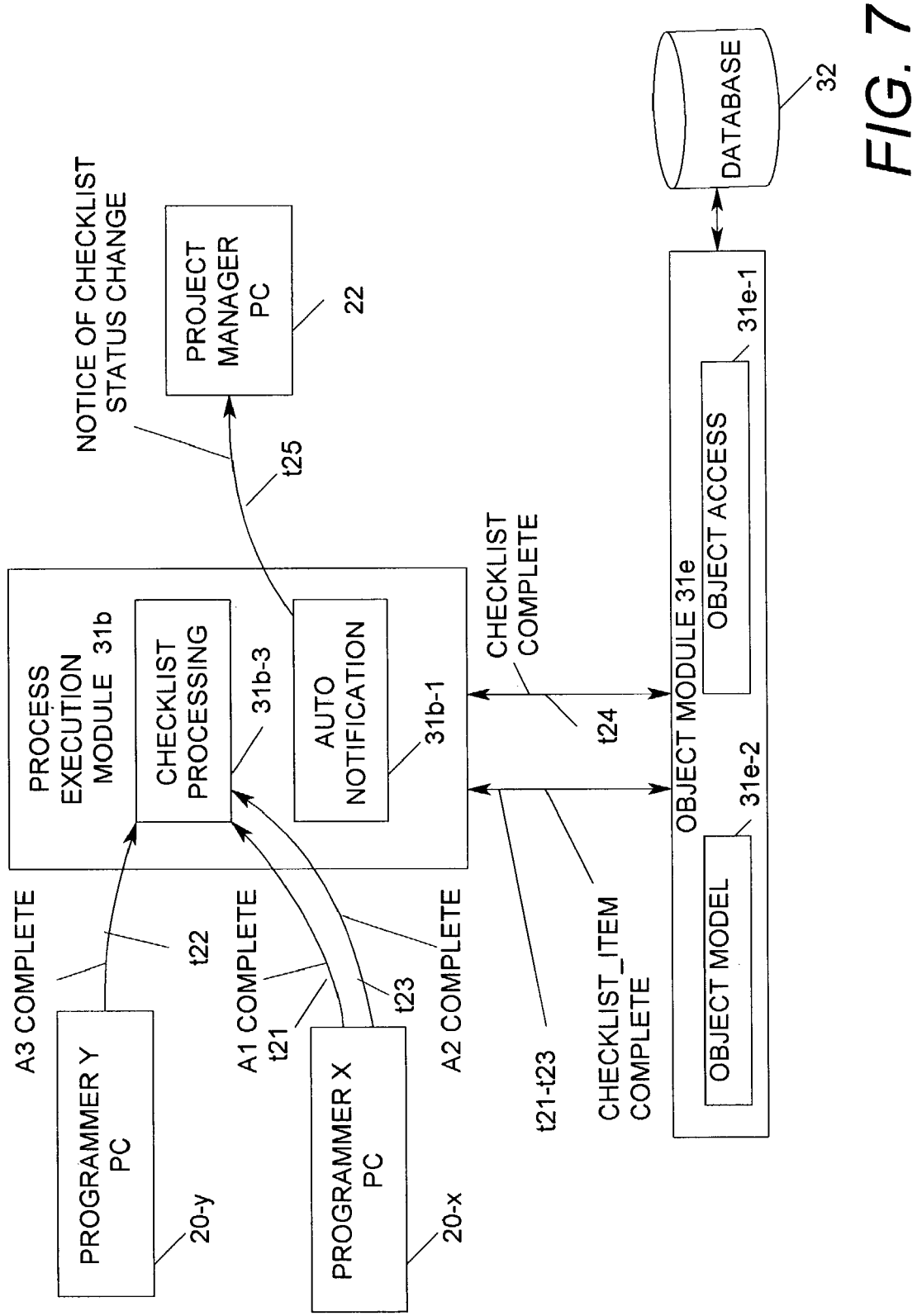
FIG. 7 shows a time sequence of events in which a process execution module, and an object module in the FIG. 2 computer program, sense when three different items on a checklist are completed, change the status of the checklist, and send a notice.

At time t21 in FIG. 7, the programmer X finishes the artifact A1 on his personal computer 20-X. Then, the programmer X uses his personal computer to indicate to the process execution module 31b that the corresponding task T1 is complete.

Later, at time t22 in FIG. 7, the programmer Y finishes the artifact A3 on his personal computer 20-Y; and then he interacts with the process execution module 31b to indicate that the corresponding task T3 is complete. Thereafter, at time t23 in FIG. 7, the programmer X finishes the artifact A2 on his personal computer 20-X; and then he interacts with the process execution module 31b to indicate that the corresponding task T2 is complete.

Assume now that in the database 32 of FIG. 7, the three tasks T1–T3 are represented by three TASK objects 41e which are linked through respective CHECKLIST_ITEM objects 41l to a single CHECKLIST object 41f. This linkage between the CHECKLIST object 41f and the TASK objects 41e is similar to that which is shown in FIG. 4A for the CHECKLIST object 41f-1.

Each time one of the tasks T1–T3 is completed, the submodule 31b-3 sends a CALL to the object access submodule 31e-1 which requests that the status of the corresponding CHECKLIST_ITEM object 41l be changed to "complete". This CALL is made at times t21, t22, and t23 in FIG. 7. When the status of all three of the CHECKLIST_ITEM objects 41e is complete, then submodule 31b-3 sends a CALL to the object access submodule 31e-1 which requests that the status of the CHECKLIST object 41f be marked complete. This CALL is made at time t24 in FIG. 7.

When a change of status occurs in the CHECKLIST object 41l, then submodule 31b-3 CALLS submodule 31b-1 to indicate that the status change took place. In response, submodule 31b-1 sends a notice to the personal computer 22 of the project manager 12. This occurs at time t25 in FIG. 7. The text of the notification comes from one particular NOTIFICATION object 41i which is linked to the PROJECT object 41c. This particular NOTIFICATION object 41i has a name, such as "CHECKLIST COMPLETE" to indicate that its text should be sent when the status of a CHECKLIST object 41f changes to complete. Also, the text has a placeholder for the name of the CHECKLIST object 41f which had the change of status. The address of where the notification is to be sent comes from an attribute of a PERSON object 41d which is linked to the NOTIFICATION object 41i.

Also, each time a change of status occurs in any one CHECKLIST_ITEM object 41l, that change of status is sensed by the submodule 31b-3 which in turn CALLS submodule 31b-1. In response, submodule 31b-1 sends a notification to the personal computer 22 of the project manager 12. However, this sensing and sending of notices is not shown in FIG. 7 since it complicates the figure and is repetitious.

Next, with reference to FIG. 8, the events which are shown at times t30–t36 will be described. Note again that a time gap occurs between time t26 of FIG. 7 and time t30 of FIG. 8, and many other events which are not shown can occur in that gap.

Figure 8:
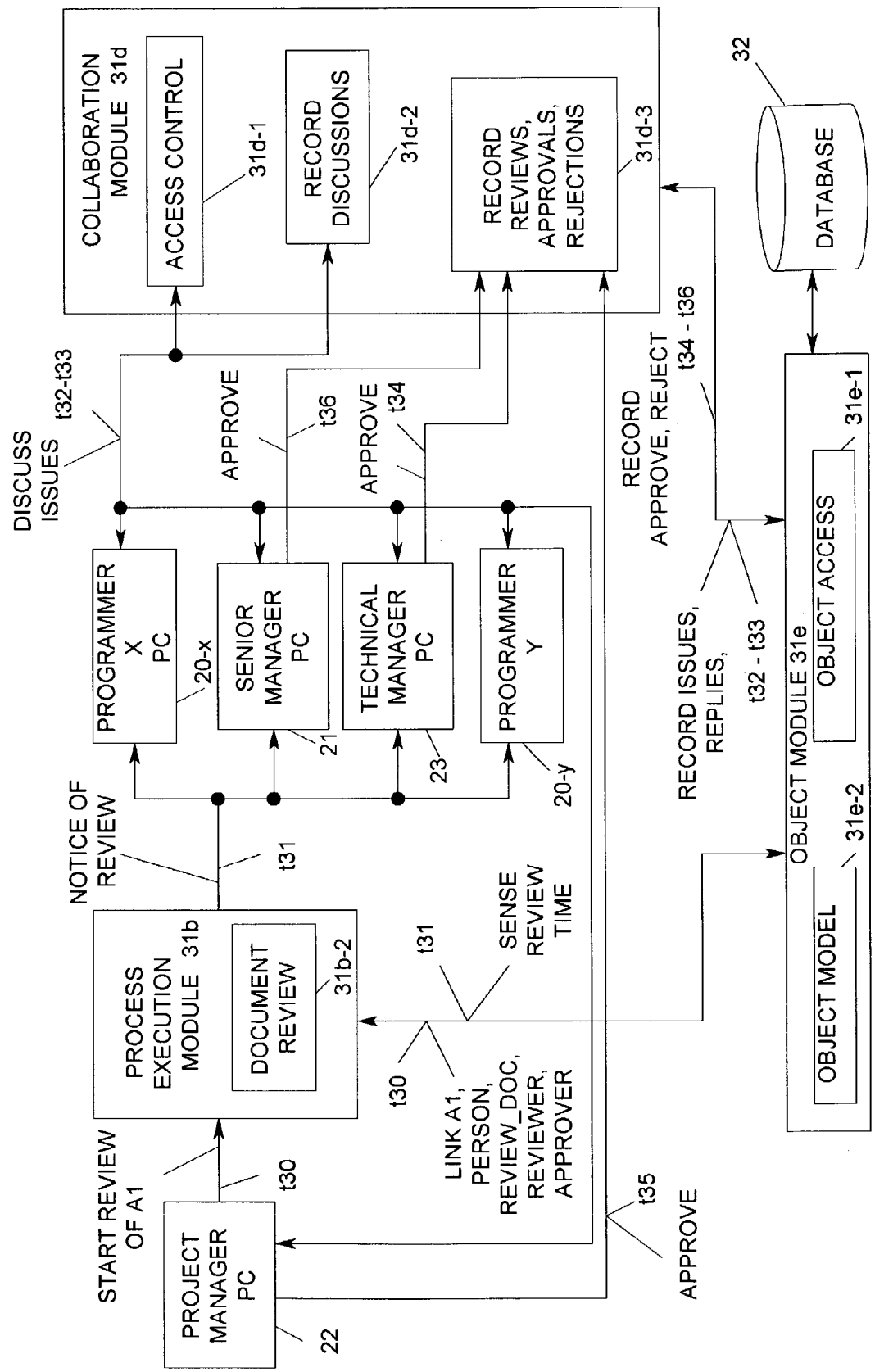
FIG. 8 shows a time sequence of events in which a process execution module, a collaboration module, and an object module in the FIG. 2 computer program, create an object that represents a review, send out notices of the review, record discussions from the review, and record approvals and rejections from the review.

At time t30 in FIG. 8, the manager 12 starts a review of the artifact A1. To do this, the manager 12 first uses his personal computer 22 to indicate that he wants to subject the artifact A1 to a review on a particular date. In response, submodule 31b-2 sends a CALL to the object access submodule 31e-1 which requests: a) that one DOCUMENT_REVIEW object 41r be created in the database 32, b) that this DOCUMENT_REVIEW object 41r have an attribute which states the start date of review, and c) that this DOCUMENT_REVIEW object 41r be linked to the PUBLISHED_DOCUMENT object 41n which represents the artifact A1.

Next, the manager 12 uses his personal computer 22 to identify particular members on his project who he wants to participate in the review, and to indicate which of those members need to approve the artifact A1. In response, submodule 31b-2 sends a CALL to the object access submodule 31e-1 which requests: a) that separate REVIEWER objects 41t be created in the database 32, and linked to the above PUBLISHED_DOCUMENT object 41n, for each participant in the review; and, b) that each REVIEWER object 41t be given a type attribute of reviewer or approver, and linked to a PERSON object 41d which represents the participant. The resulting structure of linked objects is similar to that which is shown for the DOCUMENT_REVIEW object 41r-1 in FIG. 4B.

Next, on the day that the review for artifact A1 is scheduled to start, everyone who is participating in the review is sent a notice. This occurs in FIG. 8 at time t31. Initially at time t31, the submodule 31b-2 makes a CALL to the object access submodule 31e-1 to read the start date attribute of the DOCUMENT_REVIEW object 41r. Then, if that start date equals the current date, submodule 31b-2 makes another CALL to the object access submodule 31e-1 which requests the name and e-mail address for each PERSON object 41d which is linked through a REVIEWER object 41t to the DOCUMENT_REVIEW object 41r that was created at time t30. Submodule 31b-2 then sends a notice of the review to each of those e-mail addresses. The text of the notice comes from a NOTIFICATION object 41i which is linked to the PROJECT object 41c; and, the text has a placeholder for the name of the artifact A1 that is to be reviewed as well as its location on the communication network 25.

Next, in response to the above notices, all of the reviewers use their personal computers to discuss issues that are related to the artifact A1. This discussion occurs over the communication network 25 during the time period t32–t33 in FIG. 8. At that time, each reviewer uses his personal computer to post any issue for discussion, and to write replies to issues that are posted by other reviewers. While the review occurs, submodule 31d-1 insures that nobody takes part in the review unless they are represented by one of the PERSON objects 41d which are linked to one of the REVIEWER objects 41t in the database 32. Also while the review occurs, submodule 31d-2 records the posted issues and their replies, and links them to the PUBLISHED_DOCUMENT object 41n that represents the artifact A1.

Next in FIG. 8, the artifact A1 is approved by three different individuals who participated in the review. The first approval occurs at time t34 from the technical manager 13; the second approval occurs at time t35 from the project manager 12; and the third approval occurs at time t36 from the senior manager 11.

In order for the technical manager 13 to register his approval, he first uses his personal computer 23 to ask for the current review status of the artifact A1. In response, submodule 31d-3 sends a CALL to the object access submodule 31e-1 to: a) read the name of every PERSON object 41d which is linked, through a REVIEWER object 41t, to the DOCUMENT_REVIEW object 41r that represents the artifact A1; and b) read the status attribute from the linked REVIEWER object 41t. That information is then sent from the object access submodule 31e-1 to submodule 31d-4, which in turn sends it to the technical manager's personal computer 23.

Submodule 31d-3 also checks the type attribute of the REVIEWER object 41t which represents the technical manager 13. This type attribute indicates that the technical manager 13 is an "approver", so submodule 31d-3 sends a display to the technical manager's personal computer 23 which indicates that an "approval" status can be registered. Note, if the type attribute indicated that the technical manager 13 was a "reviewer", then submodule 31d-3 would send a display which indicates that a "reviewed" status can be registered.

Later the technical manager 13 uses his personal computer 23 to indicate that he is approving the artifact A1. In response, submodule 31d-3 sends a CALL to the object access submodule 31e-1 which requests that the status attribute, in the REVIEWER object 41t which represents the technical manager 13, be changed to approved.

Each of the other two approvals of the artifact A1, which occur at times t35 and t36, take place in the same manner as the above described approval at time t34. Also in a similar manner, programmer X and programmer Y can each register the fact that they have reviewed the artifact A1.

One preferred embodiment of a system for managing the development of software, in accordance with the present invention, has now been described in detail. In addition, however, various modifications can be made to those details without departing from the essence of the invention; and, some examples of these modifications will now be described.

In FIG. 2, the computer program 31 for managing the development of software is shown as being comprised of five modules which are a software project definition module 31a, a process execution module 31b, a software development tool integration module 31c, a collaboration module 31d, and an object module 31e. However, as a modification, the computer program 31 can be changed to include some, but not all, of those modules. Thus, one embodiment of the present invention is a computer program which includes just the two modules 31a and 31e to create a customized linked object structure which represents a software development project. Another embodiment of the present invention is a computer program which includes just the two modules 31b and 31e to automate process execution in a software development project. Still another embodiment of the present invention is a computer program which includes just the two modules 31c and 31e to automate tool integration and artifact tracing in a software development project.

Also, in FIGS. 3A–3C, several different types of objects are shown and identified by reference numerals 41a–41t. Those objects include, for example, the PROJECT object 41c which represents a software development project, a NODE object 41g which represents a phase of the software development project; etc. However, as a modification, the objects 41a–41t can have any name. Thus, for example, any object "X" which represents a software development project is equivalent to the PROJECT object 41c; any object "Y" which represents a phase of a software development project is equivalent to the NODE object 41g; etc.

Also in FIG. 4A, the CRITERIALIST object 41h-1 has an entry type linkage 42 which identifies the entry criteria for the NODE object 41g-1, and has an exit type linkage 43 which identifies the exit criteria for the NODE object 41g-1. However, as an alternative, the CRITERIALIST object 41h-1 can be replaced with two new objects (not shown) which are an ENTRY_CRITERIALIST object and an EXIT_CRITERIALIST object. The ENTRY_CRITERIALIST object would link NODE object 41g-1 to the CRITERIALIST_ITEM objects 41m-1 thru 41m-5; and the EXIT_CRITERIALIST object would link NODE object 41g-1 to the CRITERIALIST_ITEM objects 41m-6 thru 41m-8.

Accordingly, it is to be understood that the present invention is not limited to just the specific details of the illustrated preferred embodiment of FIGS. 1–8, but is defined by the appended claims.

What is claimed is:

1. A computer-readable storage medium which causes a computer to operate as a server for managing the development of software by several members of a software development team, comprising:
   a computer program which is stored on said computer-readable storage medium;
   said computer program including an object-module means for creating and linking objects on a linked object structure, in a database, which has—
      a) multiple NODE objects that represent respective phases of a software development project and are linked to one PROJECT object, and
      b) multiple EXTERNAL_FILE objects that represent respective artifacts which are generated by said team members during said phases of said project; and,
   said computer program further including a software-development-tool-integration-module means having one interface that interacts with said object-module means and having another interface that interacts over a communication network with personal computers of said team members, for—
      a) identifying each artifact as the artifact is completed, and in response
      b) directing said object module means to—
         1) create a corresponding EXTERNAL_FILE object in said linked object structure that represents the newly completed artifact,
         2) create a corresponding PUBLISHED_DOCUMENT object in said linked object structure which links said corresponding EXTERNAL_FILE object to said PROJECT object, and
         3) create a traceability link in said linked object structure between said corresponding EXTERNAL_FILE object and a previously created EXTERNAL_FILE object that represents a previously completed artifact.

2. A computer-readable storage medium according to claim 1 wherein said software-development-tool-integration-module means interacts with said personal computers on said communication network to identify first and second members of said team who respectively generated said newly completed artifact and said previously completed artifact; and in response, directs said object-module means to create another traceability link in said linked object structure which, together with said traceability link between said EXTERNAL_FILE objects, interlinks first and second PERSON objects that respectively represent said first and second members of said team.

3. A computer-readable storage medium according to claim 1 wherein said software-development-tool-integration-module means interacts with said personal computers on said communication network to identify first and second phases of said project in which said newly completed artifact and said previously completed artifact respectively were generated; and in response, directs said object-module means to create another traceability link in said linked object structure which, together with said traceability link between said EXTERNAL_FILE objects, interlinks first and second NODE objects that respectively represent said first and second phases of said project.

4. A computer-readable storage medium according to claim 1 wherein said software-development-tool-integration-module means interacts with said personal computers on said communication network to identify first and second tasks in said project which were performed to respectively generate said newly completed artifact and said previously completed artifact; and in response, directs said object-module means to create another traceability link in said linked object structure which, together with said traceability link between said EXTERNAL_FILE objects, interlinks first and second TASK objects that respectively represent said first and second tasks of said project.

5. A computer-readable storage medium according to claim 1 wherein said software-development-tool-integration-module means interacts with said personal computers on said communication network to identify first and second software development tools which were used to respectively generate said newly completed artifact and said previously completed artifact; and in response, directs said object-module means to create another traceability link in said linked object structure which, together with said traceability link between said EXTERNAL_FILE objects, interlinks first and second TOOL objects that respectively represent said first and second software development tools.

6. A computer-readable storage medium according to claim 1 wherein one of said PUBLISHED_DOCW NT objects for a particular artifact is linked to a DOCUMENT_REVIEW object, which in turn is linked to multiple REVIEWER objects that are linked to respective PERSON objects which represent selected members of said team; and
   wherein said computer program further includes a collaboration-module means, coupled through said one interface to said object-module means, and coupled through said communication network to said personal computers, for enabling said selected team members to participate in a review of said particular artifact.

7. A computer-readable storage medium according to claim 6 wherein during said review, said collaboration-module means receives messages which are posted by said personal computers of said selected team members that recite issues regarding said particular artifact; and
   in response, said collaboration-module means interacts with said object-module means to record and link said messages to said one PUBLISHED_DOCUMENT object.

8. A computer-readable storage medium according to claim 6 wherein during said review, said collaboration module receives replies from said personal computers to issues raised by said selected team members; and in response, said collaboration-module means interacts with said object-module means to record and link said replies to said one PUBLISHED_DOCUMENT object.

9. A computer-readable storage medium according to claim 6 wherein each of said REVIEWER objects has a status attribute; and wherein said collaboration-module means interacts with the personal computer of one selected team member to receive signals which indicate that said one selected team member has reviewed said particular artifact; and
   in response, said collaboration-module means directs said object-module means to set the status attribute of the corresponding REVIEWER object to a reviewed state.

10. A computer-readable storage medium according to claim 6 wherein each of said REVIEWER objects has a status attribute; and wherein said collaboration-module means interacts with the personal computer of one selected team member to receive signals which indicate that said one selected team member has approved said particular artifact; and in response, said collaboration-module means directs said object-module means to set the status attribute of the corresponding REVIEWER object to an approved state.

11. A computer-readable storage medium according to claim 6 wherein said collaboration-module means interacts with said object-module means, and with said personal computers, to insure that nobody participates in a review of said particular artifact unless they are one of said selected team members.

* * * * *